United States Patent [19]
Park et al.

[11] Patent Number: 5,718,635
[45] Date of Patent: Feb. 17, 1998

[54] THREE DIMENSIONAL POWER TRANSMISSION APPARATUS

[76] Inventors: Sung Bae Park, 6-153 Changjun-dong, Mapo-ku Seoul 121-190; Sung Nam Hong, 340-1 Sekoe-dong, Mapko-ku Seoul 121-210, both of Rep. of Korea

[21] Appl. No.: 655,298
[22] Filed: May 21, 1996

[30] Foreign Application Priority Data

May 23, 1995 [KR] Rep. of Korea .................. 95-12923

[51] Int. Cl.[6] ........................................ F16D 3/16
[52] U.S. Cl. .............................. 464/114; 464/125
[58] Field of Search .............................. 464/106, 114, 464/117, 125, 147, 136, 153, 185

[56] References Cited

U.S. PATENT DOCUMENTS

| | | | |
|---|---|---|---|
| 2,026,244 | 12/1935 | Myard | 464/114 |
| 2,902,843 | 9/1959 | Forbes | 464/106 |
| 3,319,439 | 5/1967 | Hoff et al. | 464/117 |
| 4,744,264 | 5/1988 | Milenkovic | 464/117 X |
| 5,425,676 | 6/1995 | Cornay | 464/117 X |
| 5,525,110 | 6/1996 | Riccitelli et al. | 464/125 X |

*Primary Examiner*—Eileen A. Dunn
*Attorney, Agent, or Firm*—Jenkens & Gilchrist, P.C.

[57] ABSTRACT

Transmission of torque forces between an input shaft and an output shaft is provided in an apparatus whereby the axis of the input shaft and the output shaft may be displaced 90° in any direction. The input shaft and output shaft are respectively connected to a pair of drive plates, each pair of which is respectively rotatably mounted on a drive ring. The drive rings are rotatably mounted within a case which maintains the rings at a predetermined spaced-apart distance. A yoke assembly is rotatably mounted within each of the input and output drive rings, and are interconnected by a pair of revolving plates which maintain the input and output drive yoke assemblies at respective spaced-apart distances. The input drive ring and the output drive ring are each rotatable about respective predefined parallel axes, and are maintained in a predetermined relationship during rotation about the respective parallel axes by a pair of flexible cables interconnecting the input and output drive rings. In a similar manner, the input yoke and output yoke assemblies are each rotatable about respective parallel axes and are maintained in predetermined relationship during rotation about their respective axes by a pair of cables interconnecting the input and output yoke assemblies.

4 Claims, 14 Drawing Sheets

THREE DIMENSIONAL POWER TRANSMISSION APPARATUS

FIELD OF THE INVENTION

The present invention relates to a universal joint, and more particularly to a universal joint in which the output shaft is rotated about an axis that may be disposed 90° with respect to the axis of the input shaft.

HISTORY OF THE RELATED ART

Universal joints and similar devices used to transmit torque between two shafts through an angle are well known. However, in most universal joints, the angular displacement between the input and output shafts is limited to an angle of about 30°. This prohibits the transmission of rotating power, i.e., torque, between the shafts at angles greater than 30°.

Therefore, when using the limited angular displacement universal joints previously available, if it was desired to have an output shaft disposed at an angle greater than 30° with respect to the axis of the input shaft, two or more coupling assemblies were required.

Also, other universal joint arrangements have a structure that is complicated, require large volumetric space for operation, and have a large size as well as weight.

The above invention is directed to overcoming the above-mentioned problems. It is desirable to have a universal joint that has a small size and light weight so that the joint is readily adaptable to devices that have size or weight requirements, such as robot and space technology applications.

The present invention provides a rotatable drive apparatus that is capable of transmitting torque from an input shaft to an output shaft that is disposed at any angle $\alpha$, from zero to 90° in any direction, with respect to the input shaft. Universal joints having this range of motion are disclosed in Korean Patent Publication Nos. 89-1513 and 91-951. The power transmission devices disclosed in these publications comprise a pair of semi-circular transmission power rings pivotally connected to an input shaft and an output shaft. The semi-circular transmission power rings slide freely in semi-circular holes provided along one side at each end of the input and output shafts. The semi-circular transmission power rings are rotatably connected to a revolving center ring by rotating pins so that the pins revolve and slide respectively with the inner surrounding surface of the revolving center ring.

However, these shafts also have certain problems and limitations. Since the semi-circular power transmission rings are inset in the side of the each of the input and output shafts, semi-circular holes are necessarily bored in the respective shafts to receive the rings. Because the semi-circular transmission power rings slide up and down in the semi-circular hole in the respective shaft, the contacting parts are worn severely, causing the semi-circular power transmission ring to break as a result of stress induced by the movement of the parts with respect to each other.

To overcome the defects of the above-referenced Korean patent publications, the inventor of the present invention disclosed a rotating power transmission device in Korean Patent Application No. 92-22231. This device has the capability of transmitting torque from an input shaft to an output shaft through an angle of zero to 90° in any direction by means of engagement of a pair of transmission gears and a pair of smaller gears.

However, the above-described prior invention by the inventor of the present invention has problems with noise and lubrication as a result of the gear drive and loads imposed upon the gears.

SUMMARY OF THE INVENTION

The present invention is directed to overcoming the problems set forth above. More particularly, the present invention relates to a three-dimensional power transmission apparatus that rotates an output shaft in any direction from zero to 90° with respect to the axis of the input shaft. The input shaft and output shaft are respectively connected to a pair of drive plates, each pair of which is respectively rotatably mounted on a drive ting. The drive rings are rotatably mounted within a case which maintains the rings at a predetermined spaced-apart distance. A yoke assembly is rotatably mounted within each of the input and output drive rings, and are interconnected by a pair of revolving plates which maintain the input and output drive yoke assemblies at respective spaced-apart distances. The input drive ring and the output drive ring are each rotatable about respective predefined parallel axes, and are maintained in a predetermined angular relationship during rotation about the respective parallel axes by a pair of flexible cables interconnecting the input and output drive rings. In a similar manner, the input yoke and output yoke are each rotatable about respective parallel axes and are maintained in a predetermined angular relationship during rotation about their respective axes by a pair of cables interconnecting the input and output yoke assemblies.

BRIEF DESCRIPTION OF THE DRAWINGS

Embodiments of the present invention will now be described in detail in conjunction with the accompanying drawings.

DETAILED DESCRIPTION OF A PRESENTLY PREFERRED EXEMPLARY EMBODIMENT

Figure 1:
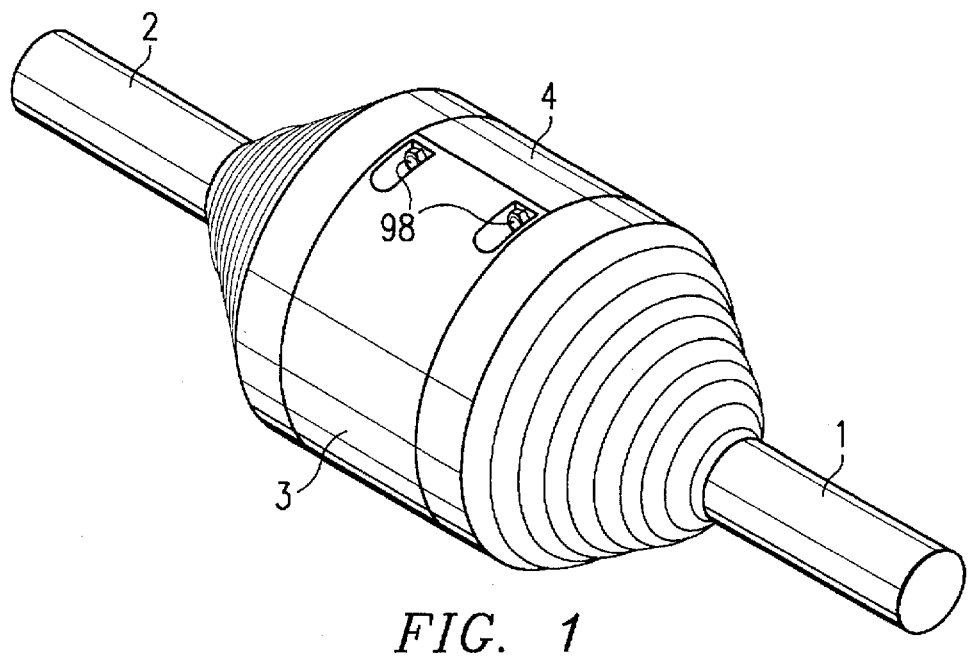
FIG. 1 is a perspective view of the apparatus of the present invention.

With reference to the accompanying drawings, the present invention will be described as follows:

The power transmission apparatus of the present invention comprises an input drive assembly 100 which receives and is operated by rotation of an input shaft 1, and an output drive assembly 200 which drives an output shaft 2 in response to rotation of the input drive assembly 100.

Since the input drive assembly 100 and the output drive assembly 200 are connected together and have the same construction and are installed in the cases 3 and 4 by identical mounting arrangements, the input and output drive assemblies 100 and 200 are identical with each other.

However, the input and output drive assemblies 100, 200 are different in that the input drive assembly 100 is connected to and pivots with the input shaft 1 and the output drive assembly 200 is connected to and pivots with the output shaft 2.

However, if the output shaft 2 should receive a driving force from other power transmission devices such as a machine, an engine or the like, or other means, and then transmits the driving power to the input shaft 1, the only difference in the device is that the positions of the input shaft 1 and the output shaft 2 are reversed. Although it may be somewhat redundant to separately describe the input shaft 1 and the output shaft 2, and their associated drive assemblies 100, 200, in the following description they are described separately to better understand the power-transmission apparatus defined by the present invention.

Figure 2:
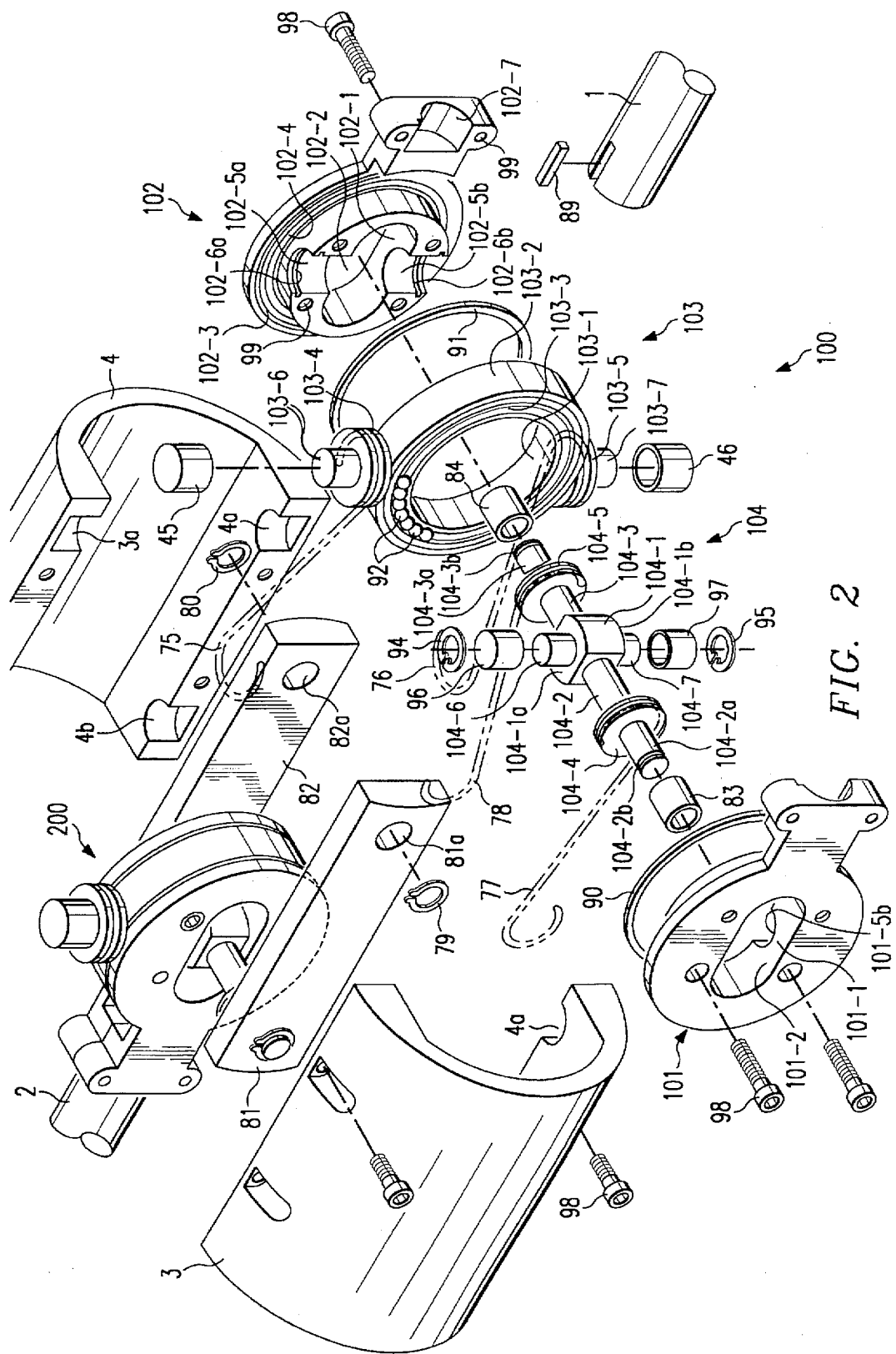
FIG. 2 is a disassembled perspective view of the apparatus of the present invention, showing elements of the input drive assembly of the apparatus in spaced-apart relationship.
Figure 3:
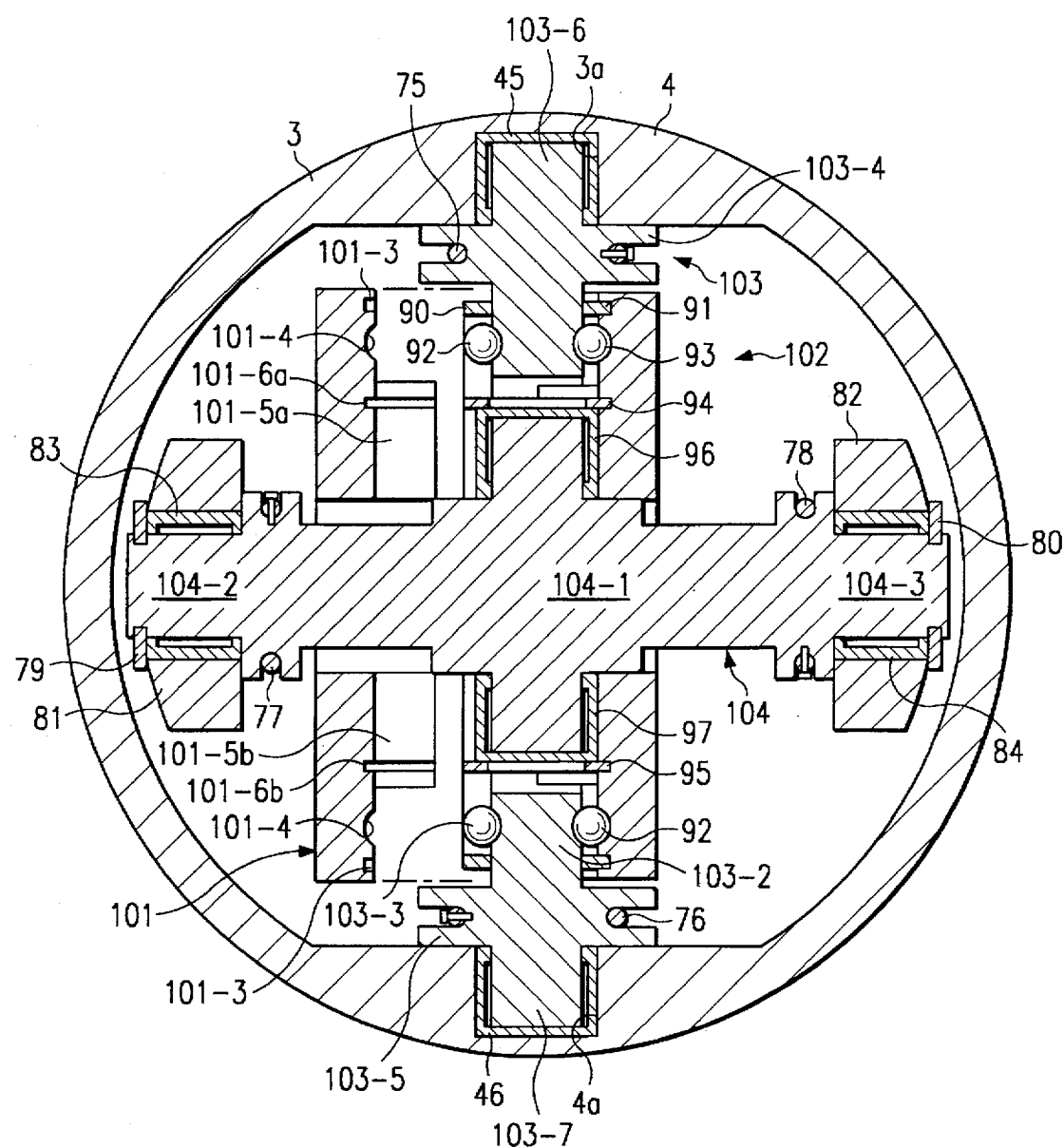
FIG. 3 is a cross-sectional view of the input drive assembly of the apparatus embodying the present invention shown in FIG. 2 with one of the drive plates spaced from the drive ring for clarity.
Figure 4:
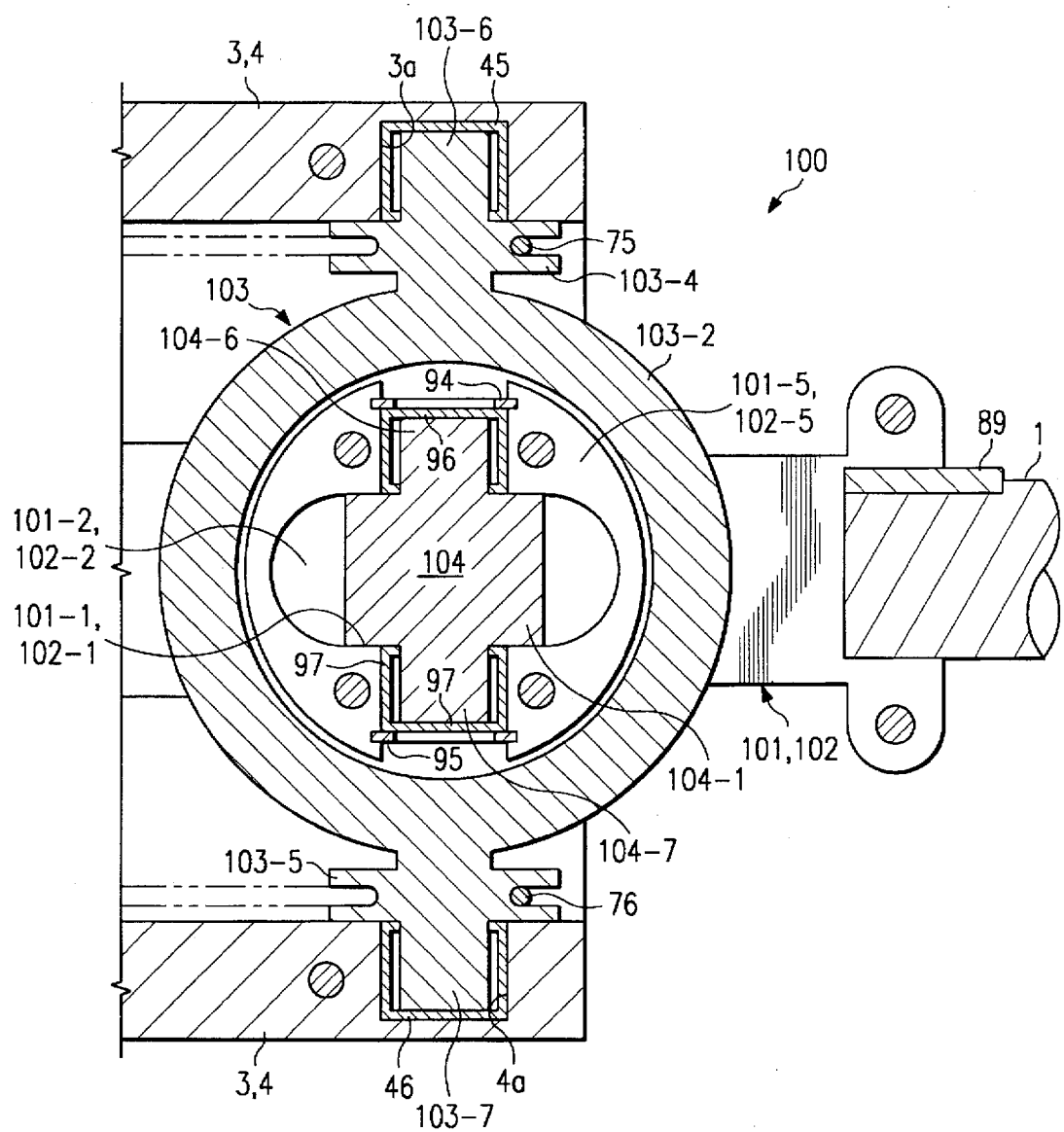
FIG. 4 is a longitudinal sectional view of the input drive assembly of the apparatus embodying the present invention shown in FIG. 2.

Turning now to FIGS. 2 through 4, the input drive assembly 100 will be described as follows:

The input drive assembly 100, as shown in the drawings, comprises a left and right input drive plates 101, 102, an input drive ring 103, and an input drive yoke 104 that is centrally disposed within the input drive ring 103. The left and right input drive plates 101, 102 are attached to respective left and right sides of the input drive ring 103.

Each of the primary components of the input drive assembly 100 comprising the present invention is described in detail below:

The left input drive plate 101 and the right input drive plate 102 have identical structure and are coupled together symmetrically on both sides of the input drive ring 103.

In the center of each of the left and right input drive plates 101, 102, elongated holes 101-2, 102-2, are defined by transverse surfaces 101-1 and 102-1 respectively. Each of the left and right input drive plates 101, 102 also has an annular seal retainer groove 101-3, 102-3, an annular ball receiving groove 101-4, 102-4, and reinforced areas 101-5, 102-5 which extend respectively inwardly toward the center of the input drive assembly 100. The reinforced areas 101-5, 102-5 respectively have semicircular holes 101-5a, 101-5b, 102-5a, 102-5b which are formed perpendicularly to the respective elongated holes 101-2, 102-2. Snap ring receiving grooves 101-6a, 101-6b, 102-6a, 102-6b, are provided at respective outer ends of the semi-circular holes 101-5a, 101-5b, 102-5a, 102-5b. Also, semi-circular holes 101-7, 102-7 are formed respectively in outward extensions of the left and right input drive plates 101, 102.

An annular ball receiving groove 103-3 is formed on each side of a ring body 103-2 of the input drive ring 103. The ring body 103-2 has a center hole 103-1 which is adapted to provide clearance for the input drive yoke 104. On the upper and lower sides of the ring body 103-2, upper and lower grooved wheels 103-4, 103-5 are integrally formed along with cylindrical posts 103-6, 103-7, all of which extend outwardly from the outer surface of the ring body 103-2.

The input drive yoke 104 is formed in the shape of a cross. The input drive yoke 104 comprises a central yoke body 104-1 and left and right cylindrical posts 104-2, 104-3 on which left and right grooved wheels 104-4 and 104-5 are respectively integrally formed, as shown in FIG. 2.

The order of assembly and operation of the above described left and right input drive assemblies 101, 102, input drive ring 103, and input drive yoke 104 will now be described as follows:

First, the input drive yoke 104, consisting of the yoke body 104-1, an upper cylindrical post 104-6, and a lower cylindrical post 104-7 are positioned within the central hole 103-1 of the input drive ring 103. Cupped needle bearings 96, 97 are inserted respectively over the upper and lower cylindrical posts 104-6, 104-7 of the input drive yoke body 104-1.

The left and right input drive plates 101, 102 are then assembled to the respective sides of the input drive ring 103.

The input drive yoke 104, which has the left and right cylindrical posts 104-2, 104-3, the left and right grooved wheels 104-4, 104-5, and the left and right end portions 104-2a, 104-3a, is positioned in the central hole 103-1 of the drive ring 103, with the end portions 104-2a, 104-3a extending respectively through the elongated holes 101-1, 102-1 provided in the right and left input drive plates 101, 102. The reinforced portions 101-5, 102-5 of the input drive plates 101, 102, after assembly, extend respectively into the central hole 103-1 of the input drive ring 103.

Upon assembly of the respective input drive plates 101, 102 with the input drive ring 103, the semi-circular holes 101-5a, 102-5a, formed respectively on the left and right input drive plates 101, 102 surround the outer surface of a cupped needle bearing 97 inserted on the lower cylindrical post 104-7 of the input drive yoke 100. Likewise, the semi-circular holes 101-6a, 102-6a surround a cupped needle bearing 96 installed on the upper cylindrical post 100-6 of the input drive yoke 100.

To prevent movement of the needle bearings 96, 97 from their installed position on the respective posts 104-6, 104-7 during operation, a seal retainer which can be snap rings 94 is inserted in the snap ring receiving grooves 101-6a, 102-6a respectively provided in the semicircular holes 101-5a, 102-5a, and a snap ring 95 is inserted in the seal retainer which can be snap rings receiving grooves 101-6b, 102-6b provided in the semi-circular holes 101-5b, 102-5b.

In addition, upper and lower transverse surfaces 104-1a, 104-1b of the input yoke body 104-1 are supported in sliding contact relationship with the respective transverse surfaces 101-1, 102-1 of the elongated holes 101-2, 102-2 provided in the left and right input drive plates 101, 102.

After assembly, the left and right input drive plates 101, 102 are aligned with the input drive yoke body 104-1 which extends between the drive plates. During operation, the left and right input drive plates are respectively rotated, and the input drive yoke 104 is accordingly moved in the same direction of rotation as the left and right input drive plates 101,102.

The left and right input drive plates 101, 102 are connected together by coupling bolts 98 extending through bolt holes 99 so that both plates 101, 102 cannot be operated separately.

A plurality of balls 92, 93 are inserted into the respective annular ball receiving grooves 101-4, 102-4 in the left and right input drive plates 101, 102 and the annular ball receiving grooves 103-3 provided in each side of the input drive ring 103. The seal or seal retainers 90, 91, 94, 95, are inserted into the respective annular grooves 101-3, 102-3, 103-3 and the left and right input drive plates 101, 102 are clamped together with the ring body 103-2 positioned between the plates 101, 102. The inner seal retainers 94, 95 cooperate with the outer seal retainers 90, 91 to prevent leakage of lubricant that is provided for the balls 92, 93. Thus, easy rotation of the balls is provided by an enclosed lubricant chamber formed by seal retainers, both radially inwardly and outwardly of the balls 92, 93.

To connect the left and right input drive plates 101, 102 to the input shaft 1, the input shaft receiving semi-circular holes 101-7, 102-7 of the left and right input drive plates 101, 102 are assembled with the input drive shaft 1. A conventional key or spline 89 is received within grooves provided in the semi-circular holes 101-7, 102-7 and the input shaft 1.

Needle bearings 83, 84 are then inserted respectively on the left and right end portions 104-2a, 104-3a of the input drive yoke 104. The assembled input drive assembly 100 is then inserted, respectively, into insertion holes 81a, 82a, provided in a pair of revolving plates 81, 82, and retained in the insertion holes by a respective snap ring 79, 80 which is received within a respective snap ring receiving groove 104-2b, 104-3b provided on the respective end portions 104-2a, 104-3a of the yoke 104. This allows the input yoke 104 to revolve freely, with respect to the revolving plates 81, 82, about an axis extending between the end portions 104-2a, 104-3a.

A pair of flexible cables 77, 78 are then respectively attached to the grooved wheels 104-4, 104-5 provided on the input drive yoke 104. The flexible cables are wrapped in opposite directions to provide rotation of the yoke in both a clockwise and counter-clockwise direction about an axis extending between the left and right end portions 104-2a, 104-3a of the input yoke 104.

The needle bearings 45, 46 are inserted over the respective upper and lower cylindrical posts 103-6, 103-7 integrally formed with the ring body 103-2 of the input drive ring 103, and then assembled in the cylindrical cavities 3a, 4a formed respectively in the left and right cases 3, 4. A pair of flexible cables 75, 76 are respectively attached to the grooved upper and lower wheels 103-4, 103-5 integrally formed on the ring body 103-2. The flexible cables are wrapped in opposite directions around the wheels 103-4, 103-5 to provide rotation of the drive ring 103, in either a clockwise or counter-clockwise direction, about an axis extending through the upper and lower posts 103-6, 103-7. Thus, the ring body is rotatably mounted to the right and left cases 3, 4.

Figure 5:
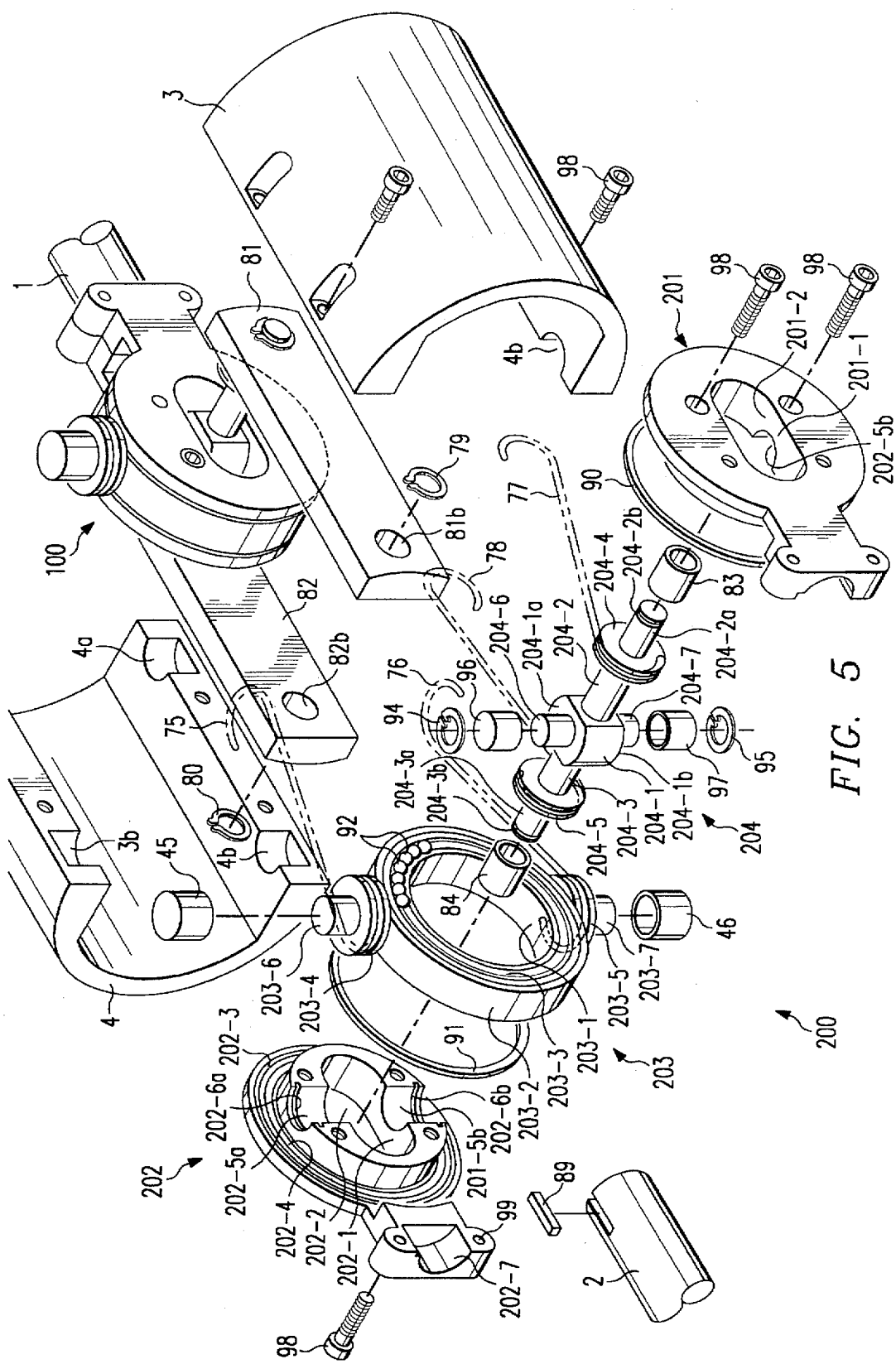
FIG. 5 is a disassembled perspective view of the apparatus of the present invention, showing elements of the output drive assembly of the apparatus in spaced-apart relationship.
Figure 6:
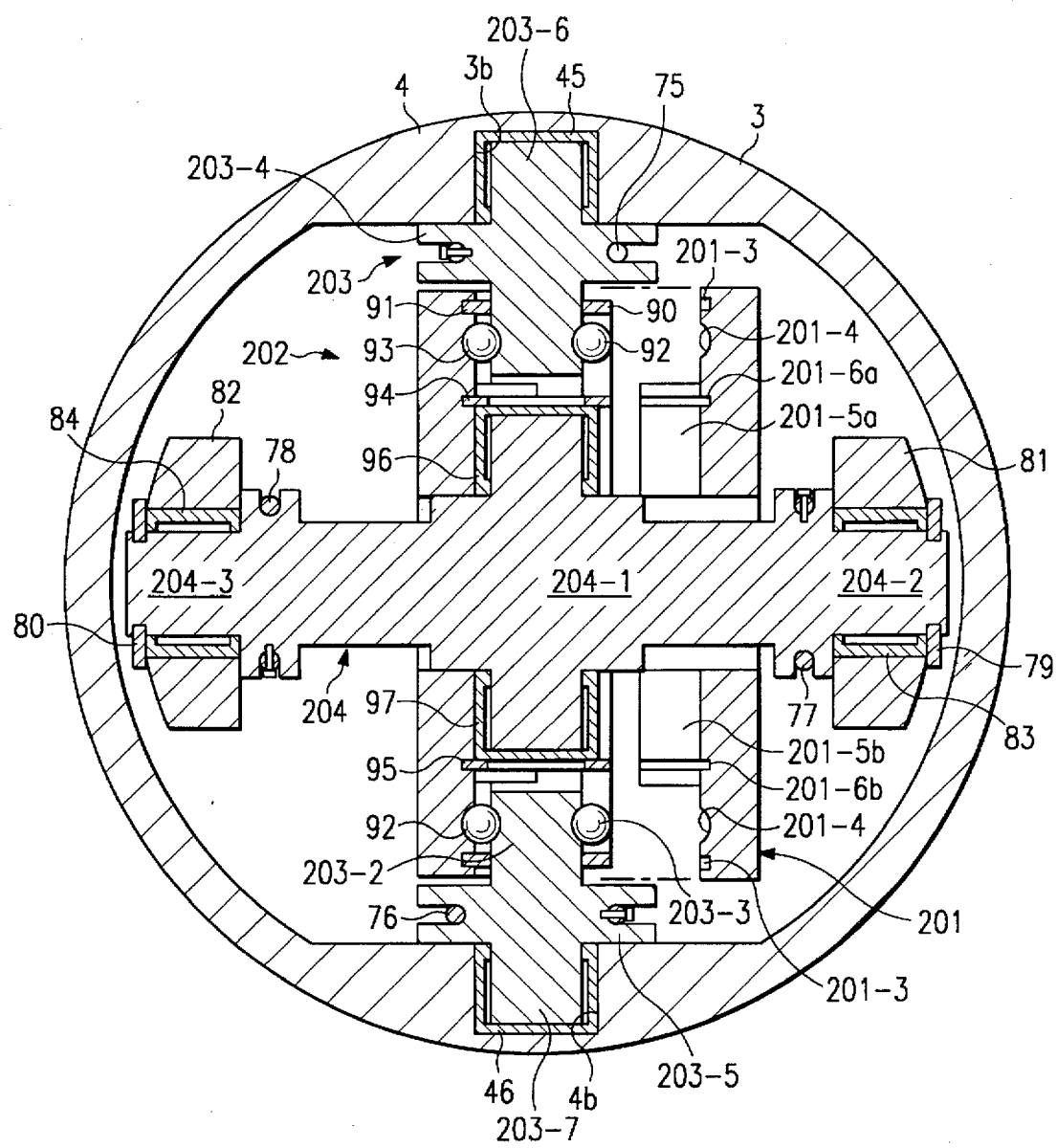
FIG. 6 is a cross-sectional view of the output drive assembly of the apparatus embodying the present invention shown in FIG. 5, with one of the drive plates spaced from the drive ring for clarity.
Figure 7:
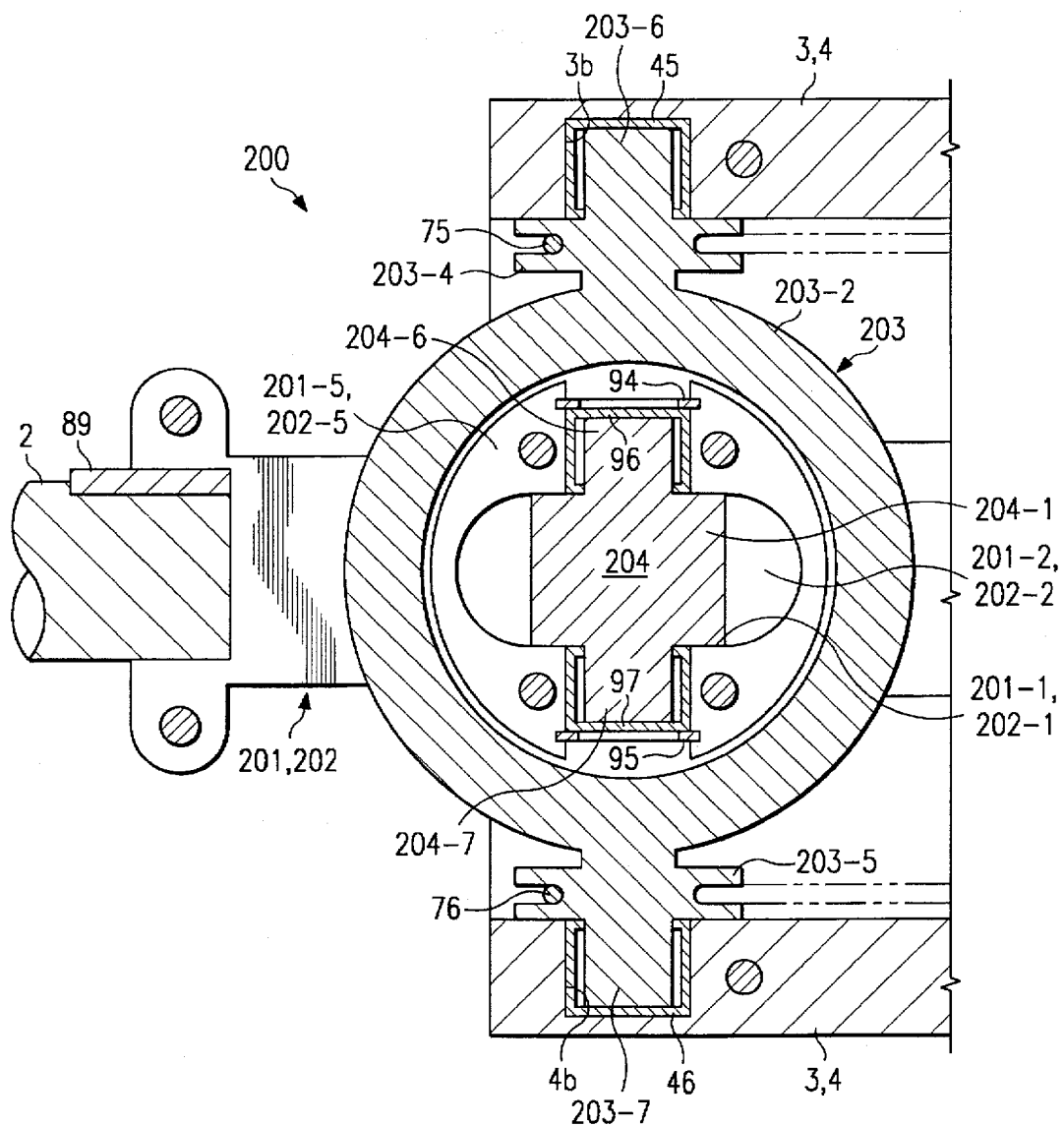
FIG. 7 is a longitudinal sectional view of the output drive assembly of the apparatus embodying the present invention shown in FIG. 5.
Figure 8:
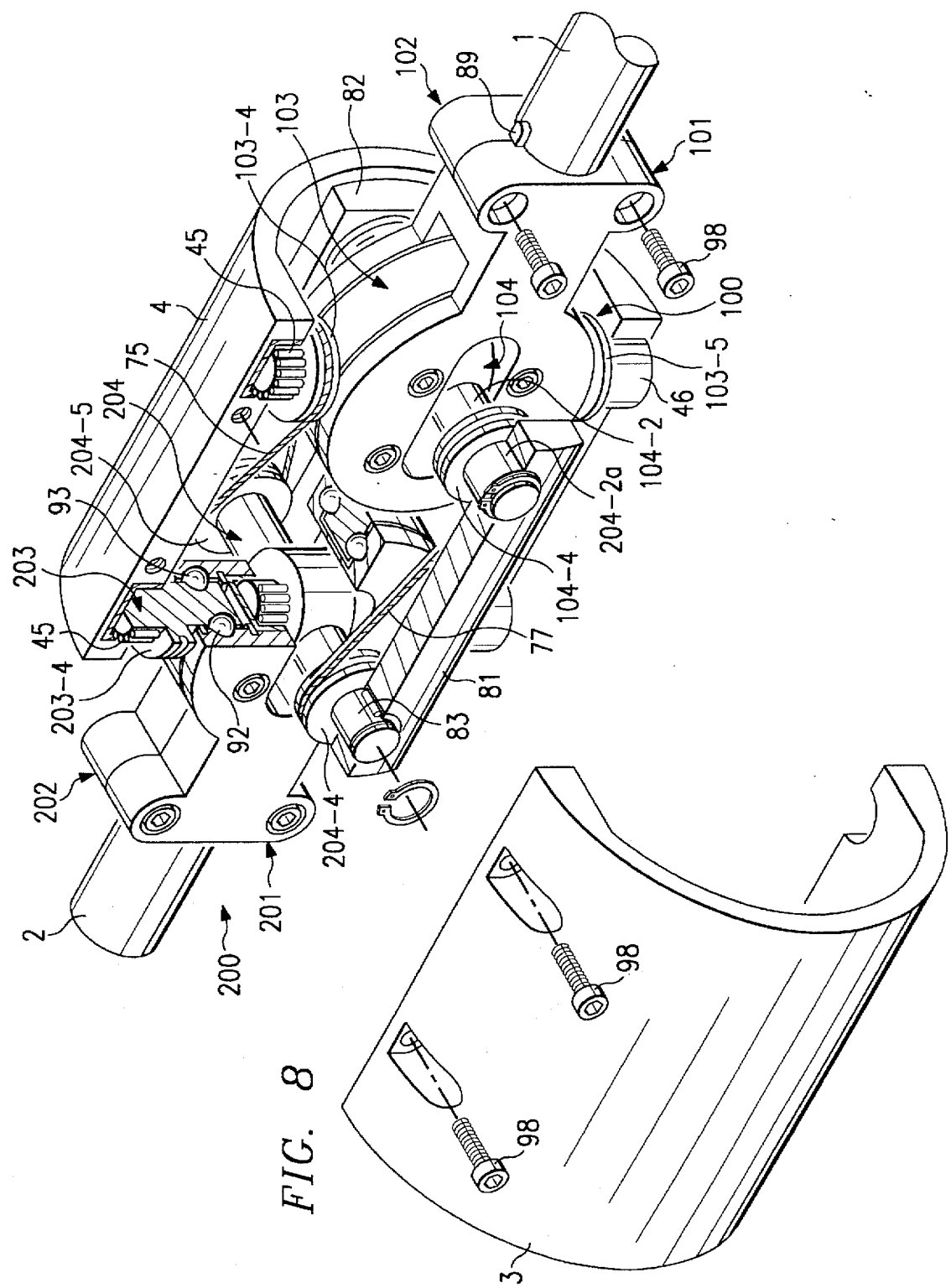
FIG. 8 is a perspective view of the apparatus embodying the present invention showing the left case removed and portions of the assembled output drive assembly and rotating plate broken away for clarity.

Turning now to FIGS. 5–7, the output drive assembly 200 has the same construction and arrangement as the above-described input power transmission assembly 100. The output drive assembly 200 will be now described as follows:

As stated above, the output drive assembly 200 is identical to the input drive assembly 100, more particularly, it is divided into right and left output drive plates 201, 202, an output drive ring 203 and an output drive yoke 204, which is assembled inside the center of the output drive ring 203. The right and left output drive plates 201, 202 are assembled respectively to the right and left sides of the output drive ring 203.

Each component of the output drive assembly 200 of the present invention will be now described below:

The left output drive plate 202 and the right drive plate 201 are identical to each other, having a symmetrical relationship, and are assembled to respective sides of the output drive ring 203.

Elongated holes 201-2, 202-2, defined by transverse surfaces 201-1, 202-1 are respectively formed in the center of the right and left output drive plates 201, 202. Annular seal retainer receiving grooves 201-3, 202-3 and annular ball receiving grooves, 201-4, 202-4, as best shown in FIG. 6, are respectively formed on inwardly facing surfaces of the output drive plates 201, 202. Semi-circular holes 201-5a, 201-5b, 202-5a, 202-5b, are respectively formed in reinforced portions 201-5, 202-5 which, upon assembly, extend into the center opening of the drive ring 203. The semi-circular holes 201-5a, 201-5b, 202-5a, 202-5b are formed at right angles with respect to the elongated holes 201-2, 202-2. Snap ring receiving grooves 201-6a, 201-6b, 202-6a, 202-6b are formed in respective outer ends of the semi-circular holes 201-5a, 201-5b, 202-5a, 202-5b. Output shaft receiving semi-circular holes 201-7, 202-7, are also formed in outwardly extending portions of the right and left output drive plates 201, 202.

Ball receiving annular grooves 203-3 are formed on both sides of a body portion 203-2 of the output drive ring 203. A center hole defined by a cylindrical wall 203-1 is provided in a central portion of the output drive ring 203 to provide clearance for the drive yoke 204. The upper and lower sides of the ring body 203-2 are respectively provided with an integrally formed upper wheel 203-4 which has a cylindrical post 203-6 extending upwardly therefrom, and a lower wheel 203-5 which has a downwardly extending cylindrical post 203-7 extending therefrom.

The output drive yoke 204 is constructed in the form of a cross, and comprises a central cylindrical output yoke body 204-1 and right and left cylindrical posts 204-2, 204-3, each of which have a respective grooved wheel 204-4, 204-5 integrally formed with the body 204-1. Cylindrical posts 204-6, 204-7 also extend respectively from an upper transverse surface 204-1a and a lower transverse surface 204-1b of the output yoke body 204-1. Right and left end portions 204-2a, 204-3a are integrally formed extensions that extend outwardly respectively from the right and left cylindrical posts 204-2, 204-3.

The detailed assembly arrangement and method of operation of the abovedescribed right and left output drive plates 201, 202, the output drive ring 203, and the output drive yoke 204 will be now described as follows:

First, the output drive yoke 204, consisting of the output drive yoke body 204-1, the upper cylindrical post 204-6, and the lower cylindrical post 204-7 is positioned within the central hole 203-1 of the output drive ring 203. The cupped needle bearings 96, 97 are assembled on the upper and lower cylindrical posts 204-6, 204-7 of the output drive yoke 204.

The output drive plates 201, 202 are then assembled to the respective right and left sides of the output drive ring 203, with the drive yoke 204 centrally disposed therein. The output drive yoke 204, consisting of the right and left cylindrical posts 204-2, 204-3, the right and left grooved wheels 204-4, 204-5, and the right and left end portions 204-2a, 204-3a which respectively extend through the elongated holes 201-1, 202-1 of the right and left side output drive plates 201, 202. In the thus assembled position, the reinforced portions 201-4, 202-4 of the drive plates 201, 202 extend into the central hole 203-1 of the output drive ring 203, in contacting relationship with each other.

Upon assembly, the upper semi-circular holes 201-5a, 202-5a respectively provided in the right and left output drive plates 201, 202 receive the upper needle bearing 96 inserted over the upper cylindrical post 204-6 of the output drive yoke 204, and the lower semi-circular holes 201-5b, 202-5b similarly receive and support the lower needle bearing 97.

To prevent the needle bearings 96, 97 from moving during operation, a snap ring 94 is assembled in the snap ring receiving grooves 201-6a, 202-6a provided in the upper semi-circular holes 201-5a, 202-5a, and a second snap ring 95 is installed in the lower grooves 201-6b, 202-6b.

In addition, the upper and lower transverse surfaces 204-1a, 204-1b of the output drive yoke body 204-1 are in intimate contact with, and slidably supported by, the transverse surfaces 201-1, 202-1 which define the elongated holes 201-2, 202-2 respectively formed in the right and left output drive plates 201, 202.

Therefore, in the assembled state, the output drive yoke 204 and the right and left output drive plates 201, 202 are in horizontal alignment. If either the right or the left output drive plates 201, 202 are rotated in any direction about the axis of the output shaft 2, the drive yoke 204 is moved in the same direction as the right and left output drive plates 201, 202.

However, the right and left drive plates 201, 202 are fixed together to prevent relative movement therebetween by a plurality of bolts 98 that extend through bolt holes 99 provided in the drive plates 201, 202.

A plurality of balls 92, 93 are inserted in the annular ball insertion grooves 201-4, 202-4 of the right and left output drive plates 201, 202 and the annular ball receiving grooves 203-3 on both sides of the output drive ring 203. The outer sea; or seal retainers 90, 91, cooperate with the inner seal or seal retainers 94, 95 to prevent leakage of lubricant that is provided for the balls 92, 93. Thus, easy rotation of the balls is provided by an enclosed lubricant chamber provided by seal retainers, both inwardly and outwardly of the balls 92, 93.

Connection of the right and left output drive plates 201, 202 to the output drive shaft 2, is provided by insertion of the output drive shaft 2 into the semi-circular holes 201-7, 202-7 provided in respective outwardly extending portions of the right and left input drive plates 201, 202. A conventional key, or spline, 89 is received within grooves provided in the semi-circular holes 201-7, 202-7 and the output shaft 2.

Needle bearings 83, 84 are then inserted respectively on the right and left end portions 204-2a, 204-3a of the output drive yoke 204. The assembled output drive assembly 200 is then inserted, respectively, into insertion holes 81b, 82b, provided in the pair of revolving plates 81, 82, and retained in the insertion holes by a respective snap ring 79, 80 which is received within a respective snap ring receiving groove 204-2b, 204-3b provided on the respective end portions 204-2a, 204-3a of the output drive yoke 204. This mounting allows the output drive yoke 204 to revolve freely, with respect to the revolving plates 81, 82, about an axis extending between the end portions 204-2a, 204-3a.

The unattached ends of the left and right flexible cables 77, 78, previously respectively attached at their other ends to the left and right grooved wheels 104-4, 104-5 provided on the input drive yoke 104, are now attached respectively, to the right and left grooved wheels 204-4, 204-5 provided on the output drive yoke 204. The flexible cables are wrapped in opposite directions to provide rotation of the yoke 204 in either a clockwise and counter-clockwise direction about an axis extending between the right and left end portions 204-2a, 204-3a of the output yoke 204. Also, the flexible cables 75, 76, 77, 78 may also comprise a roller chain and the grooved wheels 104-4, 105-4, 204-4, 204-5 may be chain sprockets.

The cupped needle bearings 45, 46 are inserted over the respective upper and lower cylindrical posts 203-6, 203-7 integrally formed with the ring body 203-2 of the output drive ring 203, and then assembled in the cylindrical cavities 3b, 4b formed respectively in the cases 3, 4. The ends of the upper and lower flexible cable 75, 76, previously respectively attached at their other ends to the upper and lower wheels 103-4, 103-5 integrally formed on the ring body 103, are attached, respectively, to the upper and lower wheels 203-4, 203-5 integrally formed on the ring body 203-2 of the output ring 203. The flexible cables 75, 76 are respectively wrapped in opposite directions around the wheels 203-4, 203-5, to provide rotation of the drive ring 203 about an axis extending through the upper and lower posts 203-6, 203-7. Thus, the ring body 203-2 is rotatably mounted in the cases 3, 4.

The three-dimensional operational relationship of the input shaft 1 with the input drive assembly 100, the output drive assembly 200, and the output shaft 2, will be described in detail below:

First, the operation of the apparatus embodying the present invention will be described with the input shaft 1 and the output shaft 2 being in alignment one with the other, i.e., they have an included angle of 180° between their respective axes. When the input shaft 1 is rotated by a rotational driving force, i.e., an applied torque force such as provided by an engine or motor, or by another transmission unit, the input shaft 1, being tightly connected to the left and right input drive plates 101, 102 by insertion in the semicircular holes 101-7, 102-7, accordingly rotates the left and right drive plates 101, 102 in the same direction as that of the input shaft.

Accordingly, the applied rotating force to the input shaft 1 is transmitted through the left and right drive plates 101, 102, resulting in a corresponding rotation of the cases 3, 4 and the revolving plates 81, 82, respectively interconnecting the input and output drive rings 103, 203 and the output drive yokes 104, 204. As described above, the upper and lower cylindrical posts 203-6, 203-7 of the output drive ring 203 are rotatably mounted in the cases 3, 4, and the right and left end portions 204-2a, 204-3a of the output drive yoke 204 are rotatably mounted in the insertion holes 81b, 82b provided in the end of the revolving plates 81, 82. Accordingly, the output drive assembly 200, and the output shaft 2 is revolved in the same direction as the cases 3, 4 and the revolving plates 81, 82.

Thus, it can be seen that since the above-mentioned input shaft 1, the input drive assembly 100, the cases 3, 4, the output drive assembly 200, and the output shaft 2 are all coupled with each other, the output shaft 2 will be rotated simultaneously and in the same direction of rotation as the input shaft 1.

In the power transmission apparatus embodying the present invention, when the input shaft 1 is moved in any direction α, wherein a has a range of 90°, the output shaft 2 will also be moved, maintaining the same angle α as that of the input shaft 1. Thus, the rotational driving force is transmitted between the input shaft 1 and output shaft 2 by maintaining the same angle α with respect to the power transmission apparatus.

Referring now to FIGS. 9–12, showing the range of motion of the input shaft 1 and output shaft 2 in upward and downward directions, will be now described below:

When the input shaft 1 is moved upwardly or downwardly, the upper and lower cylindrical posts 103-6, 103-7 of the input drive ring 103, rotatably mounted in the concave recesses 3a, 4a, of the right and left cases 3, 4 are maintained in a vertical position. The balls 92, 93, inserted in the ball receiving annular grooves 101-4, 102-4, and 103-3 between the left and right input drive plates 101, 102 and the input drive ring 103 permit the right and left drive plates 101, 102 to be moved upwardly and downwardly along with the input shaft 1.

In the assembled position, the body 104-1 of the input drive yoke 104 is rotatably supported by the needle bearings 83, 84 disposed respectively on the left and right end portions 104-2a, 104-3a of the yoke body 104-1 which extend through the respective elongated holes 101-2, 102-2 provided in the central portion of the left and right input drive plates 101, 102.

Accordingly, the input drive yoke 104 is moved to the same angle α (α≦90°) as that of the input shaft 1.

The left and right input drive yoke wheels 104-4, 104-5 are rotated as one body along with the input drive yoke 104, so that the yoke rotational position control cables 77, 78, respectively attached to the grooved wheels 104-4, 104-5, are forcibly moved through the angle α in accordance to the direction of movement of the input shaft 1.

The opposite ends of the yoke rotational position control cables 77, 78 are attached to the grooved wheels 204-4, 204-5 integrally formed with the output yoke 204, and are accordingly moved in compliance with the movement of the input yoke 104. The compliant rotation of the output yoke 204 is possible because the right and left end portions 204-2a, 204-3a of the output drive yoke 204 is rotatably supported by the needle bearings 83, 84 within the insertion holes 81b, 82b of the revolving plates 81, 82.

The output drive yoke body 204-1 is slidably supported in the elongated holes 201-2, 202-2 of the right and left output drive plates 201, 202. When the output drive yoke 204 is rotated, as shown in FIG. 9, the right and left output drive plates 201, 202 are also rotated by the output drive yoke 204.

The upward and downward movement of the output shaft 2 is made possible by the presence of the balls 92, 93 in the ball receiving groove 201-4, 202-4 of the right and left output drive plates 201, 202 and the ball receiving groove 203-4 provided in the output drive ring 203.

Figure 9:
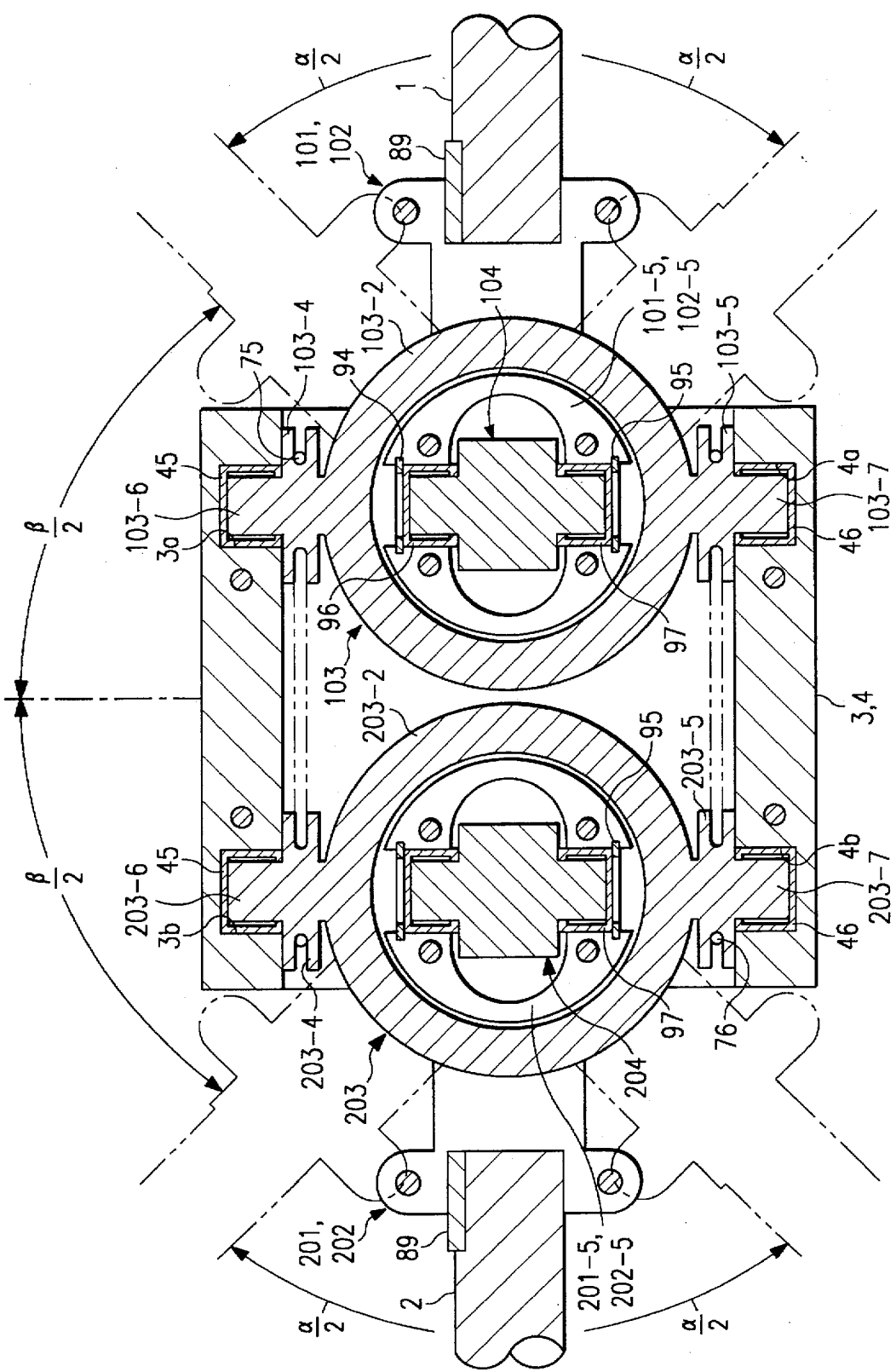
FIG. 9 is a longitudinal sectional view of the assembled apparatus embodying the present invention as shown in FIG. 8.
Figure 10:
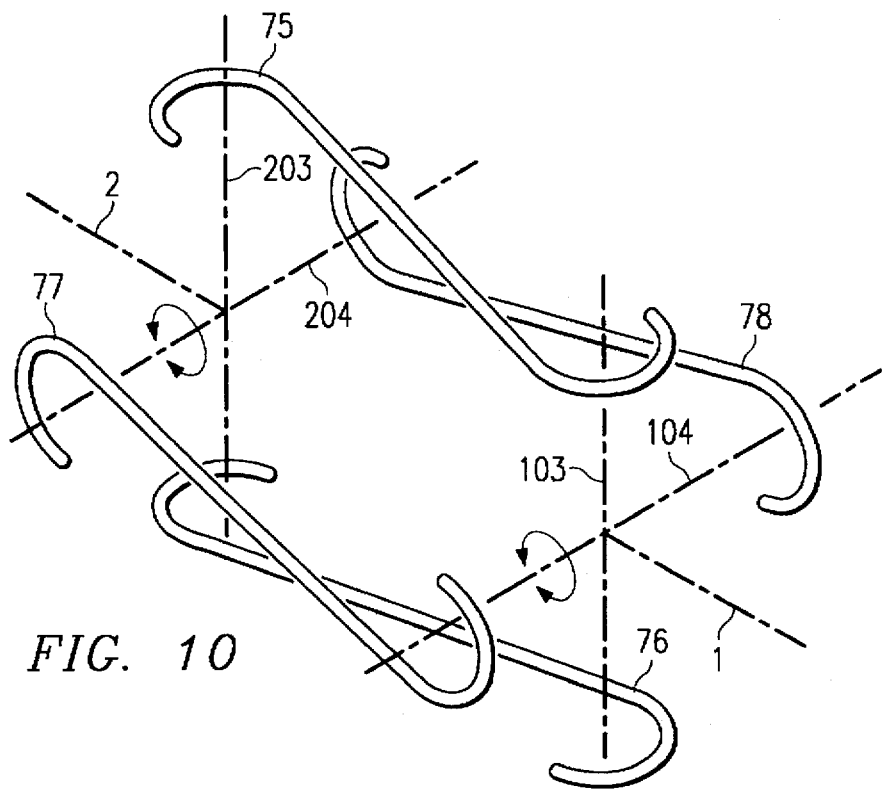
FIG. 10 is a diagrammatic representation showing the arrangement of the yoke and ring rotational position control cables with respect to the rotational axes of the input and output yokes and the input and output drive rings.
Figure 11:
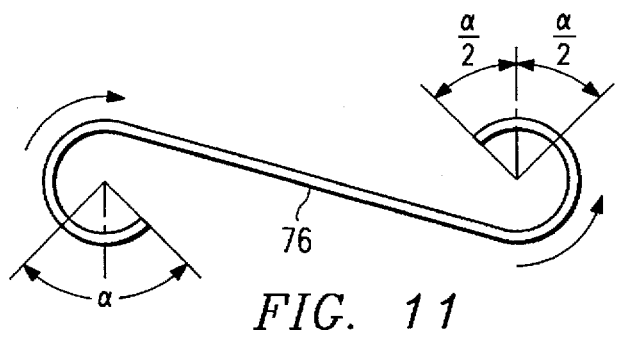
FIG. 11 is a plan view of the left yoke rotational position control cable interconnecting the right ends of the input and output yokes of the apparatus embodying the present invention.
Figure 12:
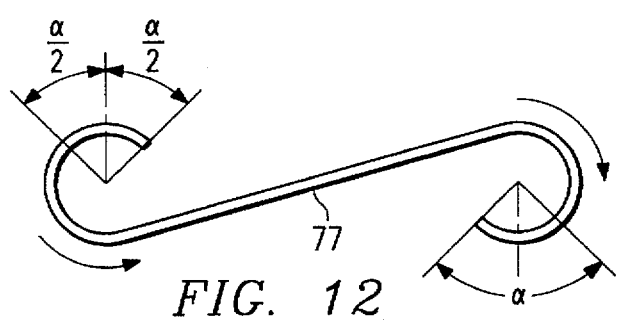
FIG. 12 is a plan view of the right yoke rotational position control cable interconnecting the ends of the input and output yokes of the apparatus embodying the present invention.

In view of the above construction, when the input shaft 1 is moved at an angle of α/2 in either an upward or downward direction with respect to a level position, as shown in FIG. 9, the output shaft 2 will also be forcibly moved at the same angle α/2 in the same direction of movement as that of the input shaft 1. When the input shaft 1 and the output shaft 2 are moved upwardly or downwardly, as viewed in FIG. 9, the angle α formed by the projected intersection of the respective center lines of the input shaft 1 and the output shaft 2 is the sum of the displacement angles α/2.

Thus, the greatest value of the angle α between the input shaft I and the output shaft 2 is identical to an angle β where β is the minimum included angle between the shafts.

Figure 13:
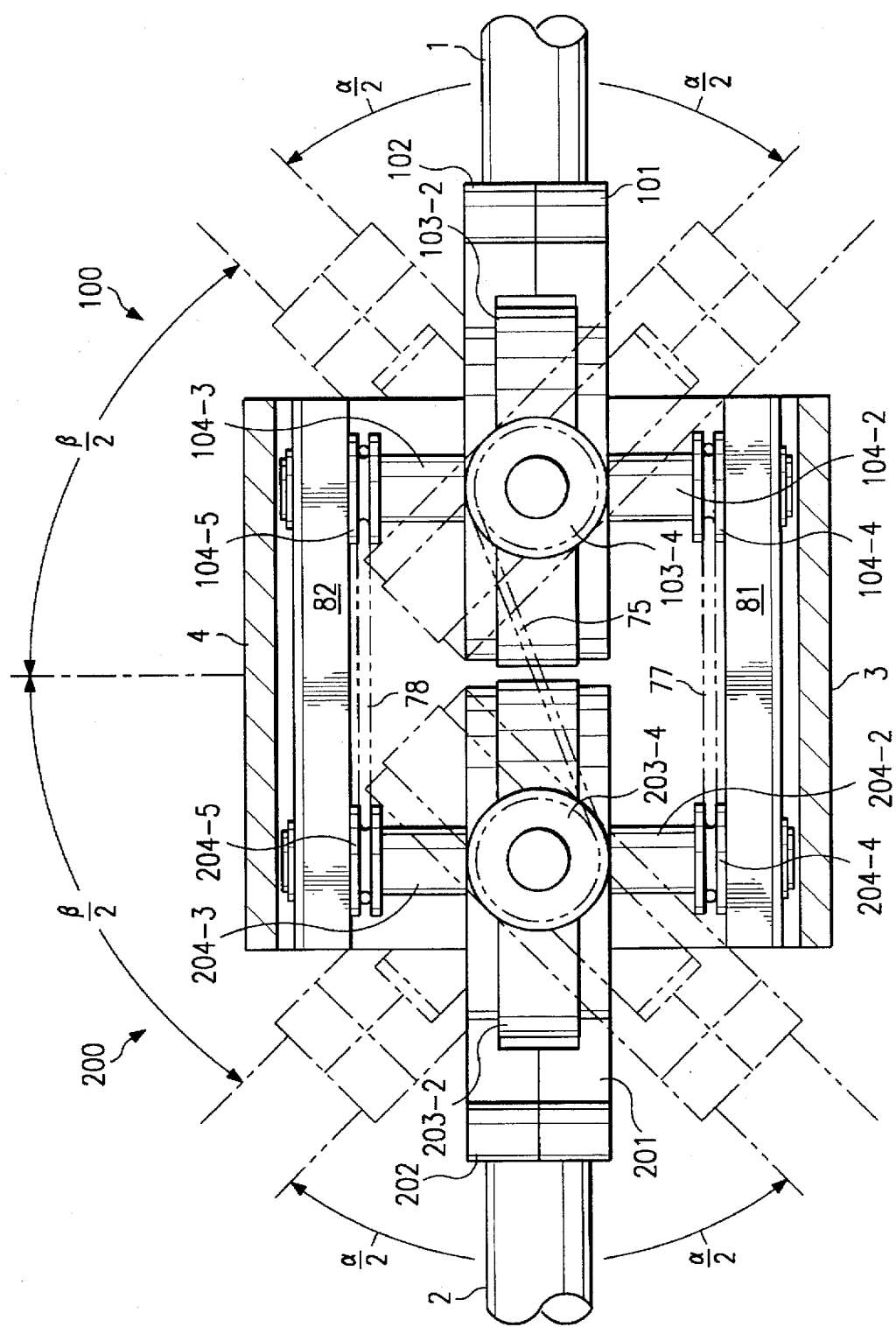
FIG. 13 is an operational view of the power transmission apparatus embodying the present invention showing the range of motion of the input and output shafts in a horizontal plane, with respect to the main body of the apparatus embodying the present invention.
Figure 14:
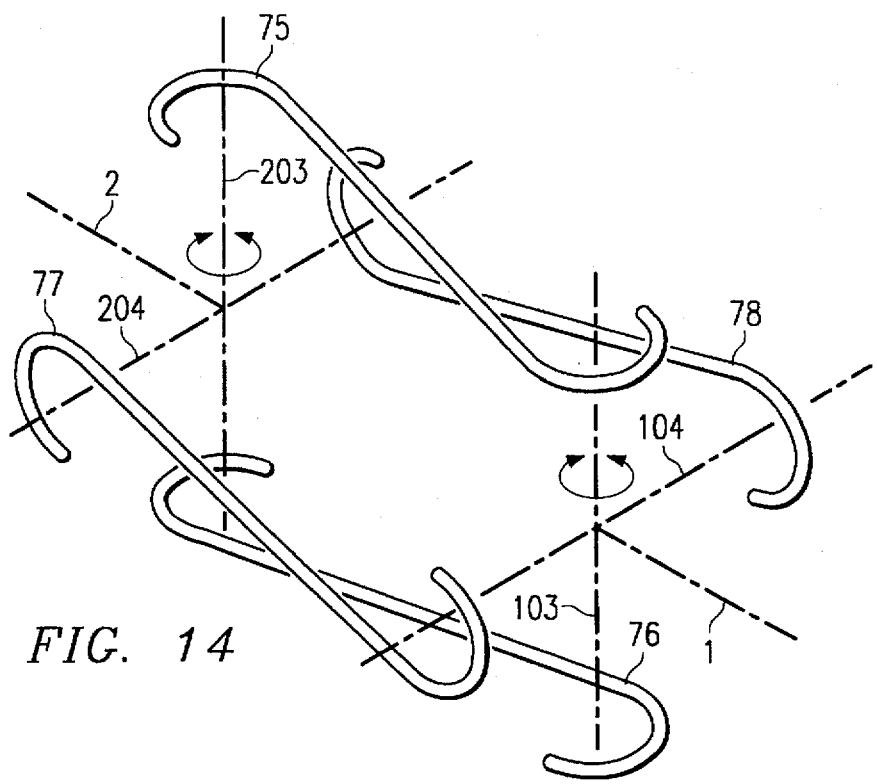
FIG. 14 is a diagrammatic representation showing the arrangement of the yoke and ring rotational position control cables with respect to the rotational axes of the input and output yokes and the input and output drive rings.
Figure 15:
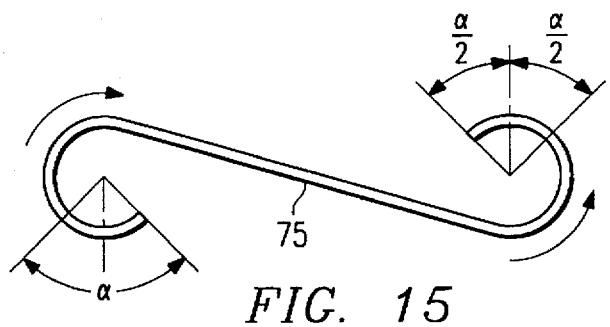
FIG. 15 is a plan view of the upper ring rotational position control cable interconnecting the upper ends of the input and output drive rings of the apparatus embodying the present invention.
Figure 16:
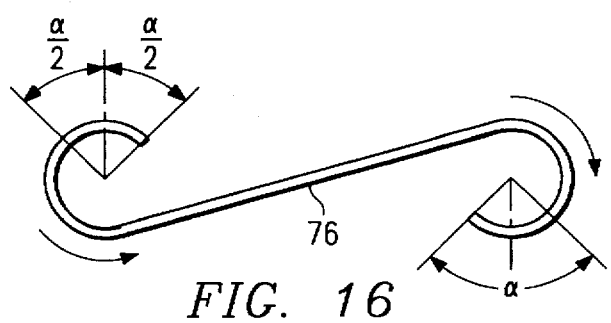
FIG. 16 is a plan view of the lower ring rotational position control cable interconnecting the lower ends of the input and output drive rings of the apparatus embodying the present invention.

Turning now to FIGS. 13–16, the operation of the transmission unit when the input shaft 1 is moved through an angle α, back and forth in a horizontal direction, will be described as follows:

FIG. 13 is a plan view showing, in contrast to the above description, horizontal movement of the unit components.

The left and right end portions 104-2a, 104-3a of the input drive yoke 104 are rotatably supported by the holes 81a, 82a of the revolving plates 81, 82. When the input shaft 1 is moved back or forth in a horizontal plane, as shown in FIG. 13, the left and right drive plates 101, 102 are moved in compliance with the movement of the input shaft 1, independently of the yoke 104, as provided by the rotatable support of the upper and lower cylindrical posts 104-6, 104-7 of the yoke 104 within the semi-circular holes 101-5a, 102-5a, 101-6b, 102-6b, of the left and right input drive plates 101, 102.

The input drive plates 101, 102 are attached to the input drive ring 103 which is rotatably mounted by needle bearings 45, 46 disposed respectively on the upper and lower cylindrical posts 103-6, 103-7 of the input drive ring 103 and which are carried in the concave recesses 3a, 4a provided in the cases 3, 4. Thus, movement of the input shaft 1 in a horizontal plane, as shown in FIG. 13, causes the right and left drive plates 101, 103 to rotate about a vertical axis extending between the cylindrical posts 103-6, 103-7.

The input drive yoke 104 is slidably supported, on the upper and lower transverse surfaces 104-1a, 104-1b, within the elongated holes 101-2, 102-3, respectively, of the left and right input transmission drive plates 101, 102. Thus, it can be seen that horizontal movement of the input shaft 1 results in movement of the input drive plates 101, 102 and the input drive ring 103, without movement of the yoke 104.

In response to the aforementioned rotation of the input drive ring 103, the upper and lower cylindrical posts 103-6, 103-7 and the upper and lower grooved wheels 1034, 103-5 are rotated simultaneously as one body. The ring rotational position control cables 75, 76 are wrapped in opposite directions around the respective upper and lower grooved wheels 103-4, 103-5, and having their ends respectively attached to the wheels, are forcibly pulled through the angle α in a direction of movement corresponding to the movement of the input shaft 1.

In response to the forced movement of the ring rotational position control cables 75, 76, as described above, the upper and lower grooved wheels 203-4, 203-5, integrally formed with the output drive ring 203, are also rotated in compliance with rotation of the grooved wheels 103-4, 103-5 formed on the input drive ring 103. Because the ends of the ring rotational position control cables 75, 76 are respectively wrapped in opposite directions about the upper and lower grooved wheels 203-4, 203-5, the output ring 203 will be rotated in a direction opposite to that of the respective input ring 103.

The above stated operation is made possible by the rotatable mounting of the input and output rings 103, 203 in the cases 3, 4 provided by the needle bearings 45, 46 and the rotational mounting of the yokes 104, 204 in the revolving plates 81, 82.

Accordingly, the output drive yoke 204 is maintained in its position with respect to the revolving plates 81, 82, and the output drive ring 203 is rotated about an axis extending between the upper and lower posts 103-6, 103-7 at the angle α of the input shaft 1. Also, the right and left output drive plates 101, 102, assembled on both side surfaces of the output drive ring 203, are moved simultaneously along with the output shaft 2.

Figure 17:
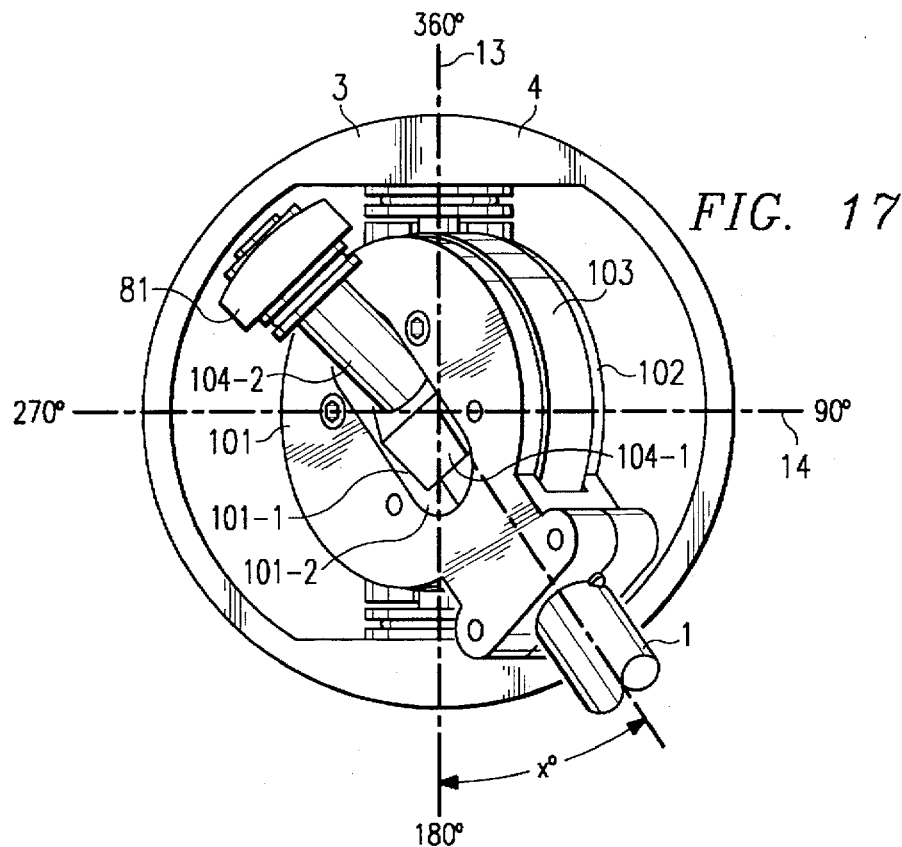
FIG. 17 is a view of the apparatus embodying the present invention showing one operational position of the input shaft.

The operation of the apparatus embodying the present invention, when the input shaft 1 is moved through an angle α (α≦90°) will be now described below:

In the following description of the operation of the apparatus embodying the present invention, FIG. 17 represents the position of the input shaft 1 when it is positioned at the angle α (α≦90°) showing the input shaft 1 positioned in the lower part of the right side of FIG. 17 where the figure is divided into vertical and horizontal areas by the phantom lines 13, 14 which cross at an angle of 90°.

In other words, the input shaft 1 is disposed at a position between 90° and 180° when viewed from the input shaft end as represented in FIG. 17.

The output shaft 2 is positioned on the opposite side of the input shaft 1, and is therefore not visible in FIGS. 17-20.

The above-stated positional relationship will be described below:

Referring to FIG. 17, the input shaft 1 is disposed at an angle α (α≦90°) in a vertical plane, as shown in FIG. 9, and is represented by the angle x° as measured in a counterclockwise direction from the vertical line 13 in FIG. 17.

As described above, when the input shaft 1 is moved at an angle α vertically downward, the input drive yoke body 104-1 of the input drive yoke 104, slidably mounted in the elongated holes 101-1, 101-2 of the left and right input drive plates 101, 102 respectively, the left and right end portions 104-2a, 104-3a of the input drive yoke 104 are rotated in the holes 81a, 82a provided in the revolving plates 81, 82.

Also, when the input shaft 1 is moved to the angle x°, the transmission drive ring 103 is also rotated. This rotation is made possible by the insertion of the upper and lower posts 103-6, 103-7 integrally formed with the drive ring 103, which are rotatably supported by needle bearings 45, 46 carried in the concave recesses 3a, 4a, of the cases 3, 4.

In response to the rotation of the input drive yoke 103, the upper wheel 103-4 of the input drive ring 103 is simultaneously rotated. The upper ring rotational position control cable 75, which has one end attached to the upper wheel 103-4, is pulled through the revolved distance, causing the upper grooved wheel 203-4 of the output drive ring 203 to revolve by the same distance in an opposite direction. Thus, the output drive ring 203 to which the output shaft 2 is connected, is also moved together with the right and left output drive plates 201, 202 in a direction opposite to that of the input shaft 1.

When the input shaft 1 is moved to the angle x°, as shown in FIG. 17, the elongated holes 101-1, 101-2 are also moved to the angle α. As described above, the elongated holes 101-1, 101-2, slidably support the input yoke body 104-1 of the input yoke 104. Thus, the elongated holes 101-1, 101-2, are positioned at the angle x° in parallel alignment with the input shaft 1.

Thus, as stated above, when the input shaft 1 is positioned at the angle x°, the elongated holes 101-1, 101-2 also slope downwardly at the angle α (α≦90°), and the input drive ring 103 is rotatable about the upper and lower cylindrical posts 103-6, 103-7.

Accordingly, the upper and lower transverse surfaces 104-1a, 104-1b of the input drive yoke body 104-1 are slidably supported by the transverse surfaces 101-1, 102-1 of the elongated holes 101-2, 102-2. The upper and lower cylindrical posts 104-6, 104-7 of the drive yoke 104 are rotatably supported by the needle bearings 96, 97 which are tilted at the angle α as measured by a line extending between the cylindrical posts 104-6, 104-7.

As a result of the slanted orientation of the main driving yoke 104, the left and right end portions 104-2a, 104-3a of the input yoke 104, rotatably mounted in the holes 81a, 82a of the revolving plates 81, 82 accordingly rotate the revolving plates 81, 82 in a clockwise direction.

Since the fight and left end portions 204-2a, 204-3a of the output yoke 204 is rotatably mounted in the holes 81b, 82bof revolving plates 81, 82, the output drive yoke 104 is also rotated by the same amount as the input drive yoke 104. As a result of the rotation of the output drive yoke 204, the upper and lower cylindrical posts 203-6, 203-7 of the output drive ring 203, rotatably mounted in the recessed cavities 3b, 4b of the fight and left cases 3, 4, also rotated, permitting the drive ring 203 to rotate about a center line extending between the cylindrical posts 203-6, 203-7.

In response to the above mentioned rotation of the drive ring 203, the right and left output drive plates 201, 202 were also rotated to the position angle x° measured in a direction opposite to that of the input shaft 1.

Figure 18:
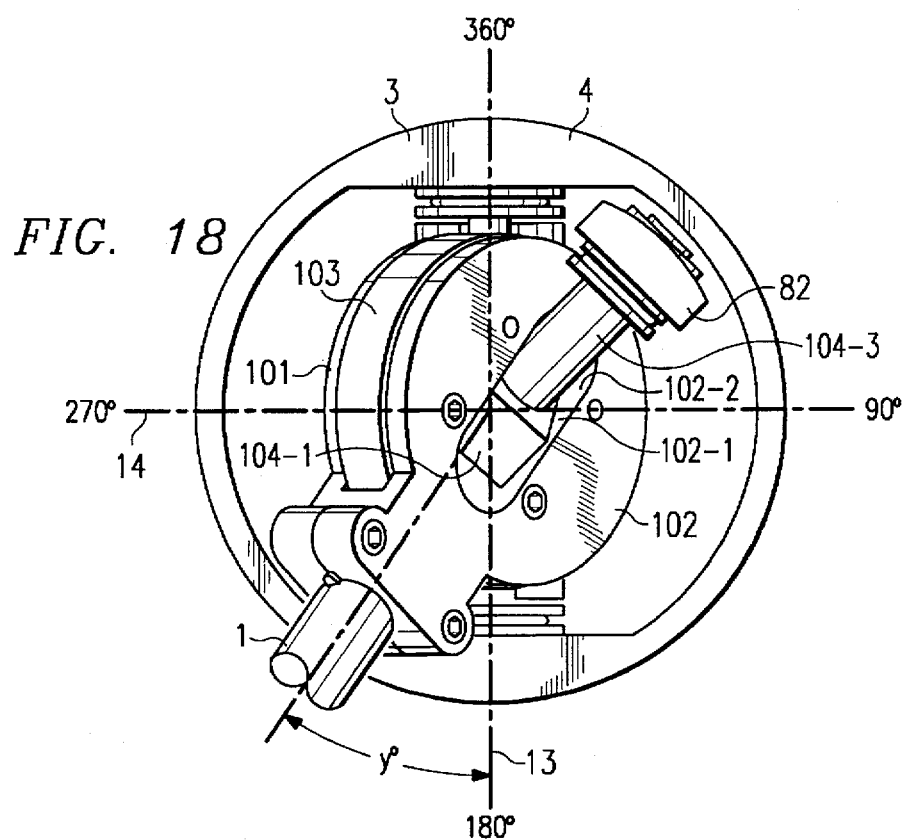
FIG. 18 is a view of the apparatus embodying the present invention showing another operational position of the input shaft.
Figure 19:
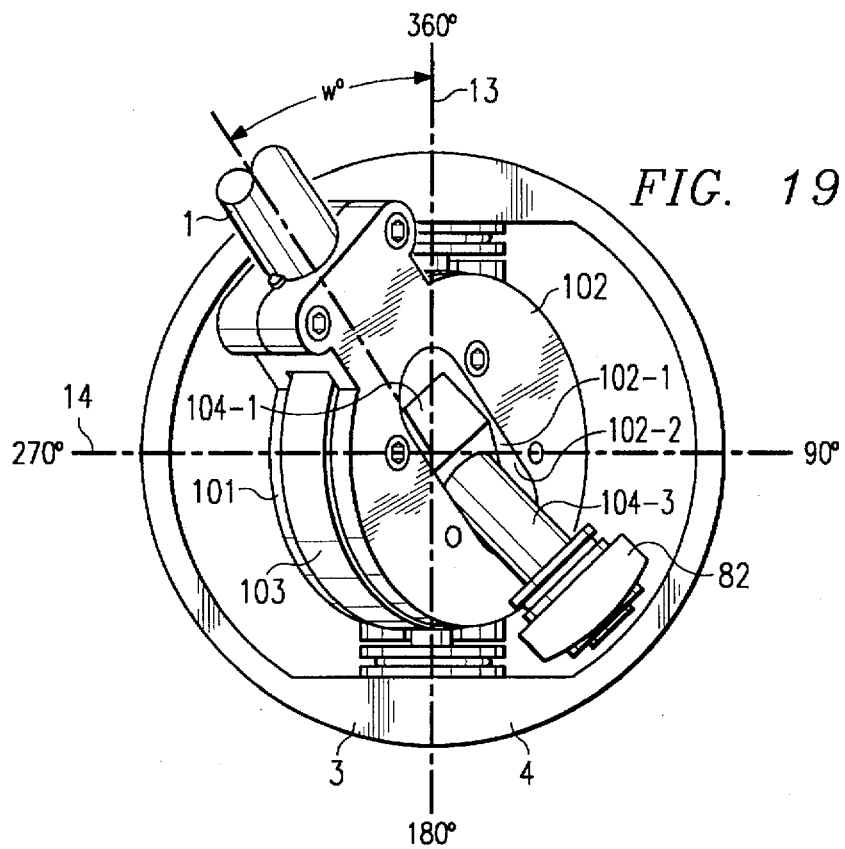
FIG. 19 is a view of the apparatus embodying the present invention showing yet another operational position of the input shaft.
Figure 20:
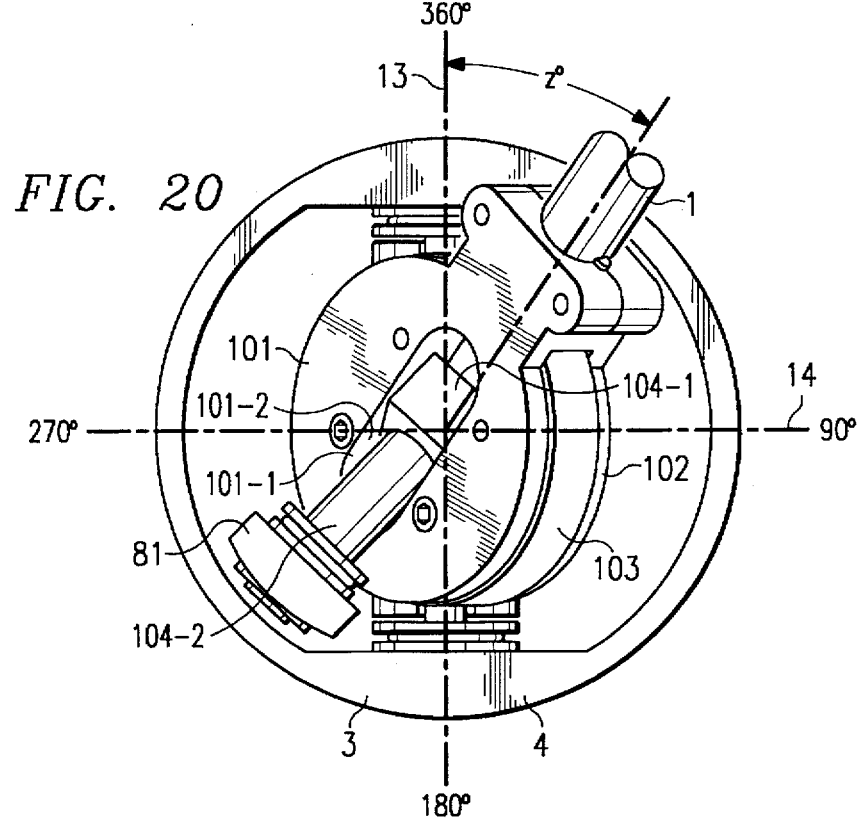
FIG. 20 is a view of the apparatus embodying the present invention showing still another operational position of the input shaft.

With reference to FIGS. 18-20, the position angle of the input shaft 1 is alternatively shown disposed at an angle y° wherein 180° wherein 180°<α<270°, at an angle w°, wherein 270°<α<360°, and at an angle of z° wherein 360°<α<90°. When disposed in any of the above-mentioned angular positions, the output shaft 2 is accordingly positioned at, or maintained at, the same angle α as that of the input shaft 1.

In conclusion, it can be seen that although the position angle of the input shaft 1 is capable of being moved within any spherical direction defined by the angle α (α≦90°), the output shaft 2 is accordingly positioned within the same spherical angle α (α≦90°). Accordingly, transmission of torque, i.e., rotational driving force, from the input shaft 1 to the output shaft 2 is transmitted three-dimensionally.

Although the input shaft 1 is moved anywhere within the angle a (α≦90°) and that position maintained during rotation of the shaft, any torque force applied to the input shaft 1 is transmitted to the output shaft 2 as a result of the input shaft 1 being connected to the right and left input drive plates 101, 102 by insertion of the input shaft 1 in the semi-circular holes 101-7, 102-7 provided therein. Thus, the input shaft 1 and the left and right drive plates 101, 102, are rotated together as a single assembly.

Also, as a result of applying the rotational driving force, the cases 3, 4 and the revolving plates 81, 82 are also rotated together as a single assembly.

The rotational driving force is thus transmitted to the output shaft 2 by the rotation of the cases 3, 4 and the revolving plates 81, 82. The upper and lower cylindrical posts 203-6, 203-7, integrally formed with the output drive ring 203, are rotatably mounted in the recessed cavities 3b, 4b of the right and left cases 3, 4. Also, the right and left end portions 204-2a, 204-3a of the output drive yoke 204 are rotatably mounted in the holes 81b, 82bprovided in the revolving plates 81, 82. Thus, by the rotational mounting of the output drive ring 203 in the cases 3, 4, and the rotational mounting of the output yoke 204 in the revolving plates 81, 82, the revolving, or torque, force is transmitted through the cases 3, 4 and the revolving plates 81, 82 to the output drive assembly 200.

As can be seen from the above description, in the apparatus embodying the present invention, the input shaft 1, the input drive assembly 100, the right and left cases 3, 4, the revolving plates 81, 82, the output drive assembly 200, and the output shaft 2 are all connected with each other. Thus, when the input shaft 1 is positioned at any spherical angle α (α≦90°), and rotated, the output shaft 2 will be simultaneously positioned at the same angle α (α≦90°) and rotated at the same velocity as the input shaft 1.

Figure 21:
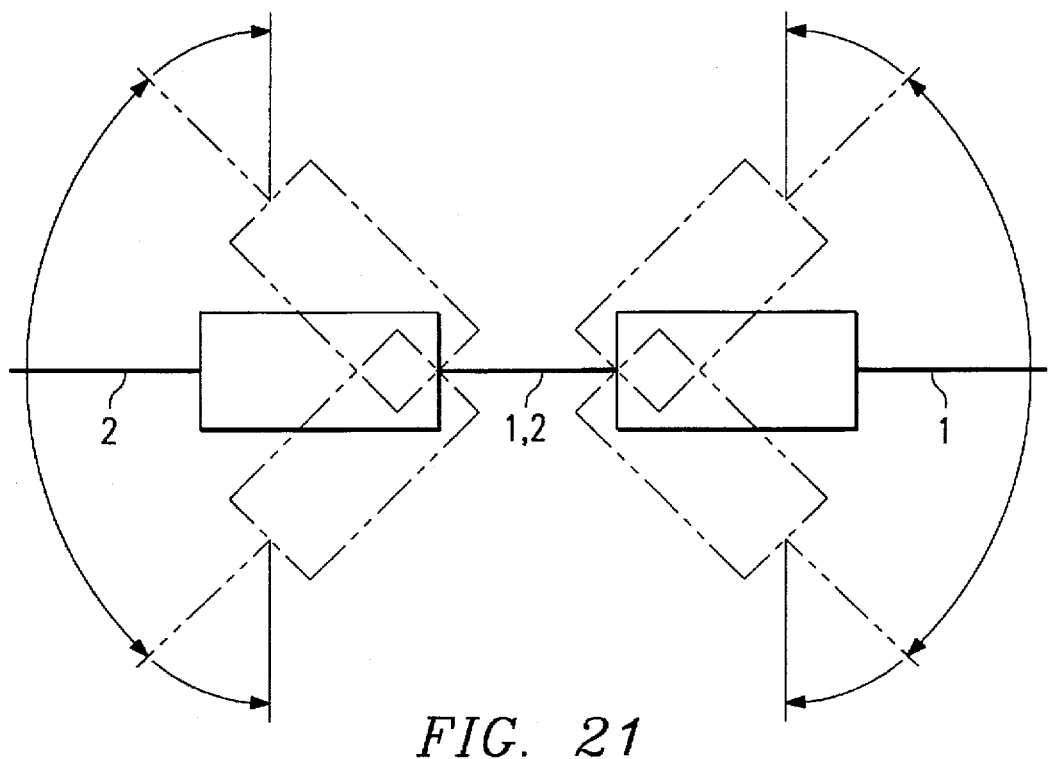
FIG. 21 is a schematic view illustrating the angular relationship of a plurality of interconnected power transmission apparatuses embodying the present invention.

If desired, two or more of the three-dimensional power transmission apparatuses embodying the present invention may be connected with each other as shown schematically in FIG. 21.

As described above, the apparatus embodying the present invention provides an input shaft that may be positioned at any angle within a spherical range of 90°, and rotated while being maintained at that angle. The torque force applied to the input shaft 1 will be transmitted to the output shaft 2 which will be accordingly positioned at the same angle as the input shaft 1.

Therefore, the apparatus of the present invention is a useful invention.

What is claimed is:

1. An apparatus for transmitting rotational force from an input shaft to an output shaft when the axis of the input shaft is disposed at an angle α (0°≦α≦90°) with respect to the axis of the output shaft, comprising:

a pair of input drive plates connected to the input shaft;

a drive ring rotatably mounted between said pair of input drive plates;

an input drive yoke rotatably mounted within said input drive ring;

a pair of output drive plates connected to said output shaft;

an output drive ring rotatably mounted between said output drive plates;

an output drive yoke rotatably mounted within said output drive ring;

a right and left case member adapted for interconnection with each other and having recesses provided therein adjacent opposed ends of the case members for rotatably respectively receiving said input drive ring and said output drive ring;

a pair of elongated plates, each having apertures disposed adjacent respective first and second ends and adapted to rotatably receive said input drive yoke in the apertures disposed at the respective first ends of the plates, and rotatably receive the output drive yoke in the apertures disposed adjacent said second ends of the plates;

a first pair of flexible cables connected between said input drive ring and said output drive ring, and adapted to rotate one of said drive rings in a predetermined direction about a predefined axis in response to rotating the other of said drive rings in a direction opposite to said predetermined direction about a second predetermined axis; and a second pair of flexible cables connected between said input drive yoke and said output drive yoke and adapted to rotate one of said drive yokes in a predetermined direction about a predefined axis in response to rotating the other of said drive yokes in a direction opposite to that of the predetermined direction about a second predetermined axis.

2. An apparatus for transmitting rotational force from an input shaft to an output shaft, as set forth in claim 1, wherein said pair of input drive plates and said pair of output drive plates each have a pair of elongated holes centrally disposed therein and at least partially defined by horizontally spaced transverse surfaces, said input drive yoke having a pair of spaced-apart transverse surfaces adapted to be slidably supported by the transverse surfaces at least partially defining the elongated holes centrally disposed within the pair of input drive plates, said output drive yoke having a pair of spaced apart transverse surfaces adapted to be slidably supported by the transverse surfaces at least partially defining the elongated holes provided in the pair of output drive plates, a plurality of pairs of radially spaced annular grooves each adapted to receive a seal retainer therein, said pair of annular grooves being formed on an inwardly facing surface of each member of said pair of input drive plates and each member of said pair of output drive plates, a pair of radially spaced annular grooves each adapted to receive a seal retainer therein formed on opposed surfaces of said input and output drive rings in alignment with said grooves adapted to receive a seal retainer provided on the inner surfaces of said input and output drive plates; and a plurality of seal retainers, each being respectively positioned in aligned grooves provided on each of the inwardly facing surfaces of the input drive plates and the aligned grooves in the input drive ring, and in the respective grooves provided on the inner surface of each of the output drive plates and the aligned grooves in the output drive ring.

3. An apparatus for transmitting rotational force from an input shaft to an output shaft, as set forth in claim 1, wherein each of said input drive plates and each of said output drive plates has an annular groove, adapted to receive a plurality of balls therein, formed on a respective facing surface of each member of said pair of input drive plates and output drive plates, and each of said input and output drive rings have an annular groove, adapted to receive a plurality of balls therein, formed in opposed surfaces of each of said input drive ring and said output drive ring, and positioned in alignment, when assembled together, with the grooves adapted to receive a plurality of balls formed in the respective pair of first drive plates and second drive plates; and a plurality of balls, each being respectively positioned in aligned grooves provided on each of the inwardly facing surfaces of the input drive plates and the aligned grooves in the input drive ring, and in the respective grooves provided on the inner surface of each of the output drive plates and the aligned grooves in the output drive ring.

4. An apparatus for transmitting rotational force from an input shaft to an output shaft, as set forth in claim 1, wherein each of said input drive yoke and said output drive yoke have a centrally disposed body and a pair of wheels each of which is respectively spaced outwardly from said body and integrally formed therewith, said wheels being adapted to attachably receive an end of one of said second pair of flexible cables within a groove formed in each of said wheels.

* * * * *